United States Patent
Nason et al.

(10) Patent No.: US 8,194,644 B2
(45) Date of Patent: Jun. 5, 2012

(54) CLIENT/SERVER QUEUING METHOD TO COORDINATE CONNECTION ATTEMPTS TO A SERVER

(75) Inventors: Christopher James Nason, Kanata (CA); Robert Star, Kanata (CA)

(73) Assignee: Mitel Networks Corporation, Ottawa, Ontario (CA)

( * ) Notice: Subject to any disclaimer, the term of this patent is extended or adjusted under 35 U.S.C. 154(b) by 1394 days.

(21) Appl. No.: 11/684,373

(22) Filed: Mar. 9, 2007

(65) Prior Publication Data

US 2007/0211708 A1    Sep. 13, 2007

(30) Foreign Application Priority Data

Mar. 10, 2006    (EP) ..................... 06251301

(51) Int. Cl.
  *H04L 12/66* (2006.01)
  *G01R 31/08* (2006.01)
  *G08C 15/00* (2006.01)
  *H04J 1/16* (2006.01)
(52) U.S. Cl. ............ 370/352; 370/230; 370/230.1; 370/235; 709/203; 709/227
(58) Field of Classification Search .......... 455/453; 370/252, 230, 231, 235, 390, 395.2, 432, 370/356; 379/266.04; 709/203, 227

See application file for complete search history.

(56) References Cited

U.S. PATENT DOCUMENTS

| | | | |
|---|---|---|---|
| 6,763,093 B2* | 7/2004 | Lumsden | 379/88.22 |
| 2002/0087714 A1* | 7/2002 | Connor | 709/235 |
| 2002/0165981 A1* | 11/2002 | Basturk et al. | 709/242 |
| 2004/0247103 A1 | 12/2004 | Tanimoto | |
| 2005/0091388 A1* | 4/2005 | Kamboh et al. | 709/228 |
| 2005/0195741 A1* | 9/2005 | Doshi et al. | 370/230 |

FOREIGN PATENT DOCUMENTS

| | | |
|---|---|---|
| EP | 0 932 282 | 7/1999 |
| EP | 1 411 697 | 4/2004 |
| WO | WO 99/55040 | 10/1999 |

OTHER PUBLICATIONS

Berger, D et al.: "TCP-friendly medium access control for ad-hoc wireless networks: alleviating self-contention" Mobile Ad-Hoc and Sensor Systems, 2004 IEEE International Conference on Fort Lauderdale, FL, USA Oct. 25-27, 2004,Piscataway, NJ, USA, IEEE, US, Oct. 25, 2004, pp. 214-223, XP010765230.

* cited by examiner

*Primary Examiner* — Joe Cheng
*Assistant Examiner* — Nicholas Jensen

(57) ABSTRACT

A client/server network includes a plurality of IP devices in communication with a central server. The plurality of IP devices communicate with one another to queue themselves onto a linked list. The plurality of IP devices then connect to the central server in the order determined by the linked list. Prior to attempting to connect to the central server, each of the plurality of IP devices verifies that a number of IP devices currently attempting to connect to the central server is not equal to a maximum number.

6 Claims, 12 Drawing Sheets

CLIENT/SERVER QUEUING METHOD TO COORDINATE CONNECTION ATTEMPTS TO A SERVER

FIELD OF THE INVENTION

The present invention relates to client/server networks, in particular, a queuing method to coordinate connection attempts of stimulus IP phones to a server.

BACKGROUND OF THE INVENTION

In a typical client/server voice communication network, multiple IP phones communicate with a PBX using Transmission Control Protocol (TCP) connections. The IP phones connect to the PBX using a 3-stage process. The process generally includes acquiring a TCP link to the PBX, making a secure connection and creating a control link, or registering, with the PBX. IP phones that rely on stimulus messaging generally require a persistent TCP control link to their PBX. Establishing a TCP connection generally requires a three-way handshake.

During certain events, such as recovery from a power failure, for example, the PBX may become flooded when a large number of IP phones attempt to establish connections at the same time. The large number of SYN packets in the queue along with other messages results in the requesting IP phones waiting a long time prior to establishing a connection with the PBX.

PBX connection delays for all IP phones are exacerbated by the addition of security protocols, such as Secure Sockets Layer (SSL). Processing SSL connections is time-consuming due to the large number of computations required in creating keys, which have the highest level of security as required by IP phones. As such, the PBX generally limits the number of IP phones able to simultaneously attempt SSL connections and refuses further SSL attempts once the quota for the PBX has been reached. It is common in such circumstances for IP phones to be turned away, forced to disconnect their TCP connection and attempt a 3-way handshake on a non-secure cleartext port of the PBX.

Once an IP phone connects to a secure or non-secure port, it registers with the PBX and provides its device capabilities in the registration request. If the IP phone is on an unsecure port yet advertises that it supports SSL, the PBX may reject the registration request and force the IP phone to disconnect in order to retry the SSL connection. If the PBX accepts the registration, it will send the IP phone a large number of stimulus commands to configure the IP phone to be able to make and accepts phone calls. The large internal messaging flows associated with the configuration for large bursts of IP phones may result in significant degradation of PBX performance.

Allowing a large number of IP phones to connect to the PBX in a random manner is an inefficient and lengthy process. One solution is to optimize the number of TCP SYN packets that each phone sends out. Limiting the amount of time that the IP phones attempt to connect to the PBX to, say, 10 seconds, concentrates the transmission of SYN packets to a short period. If the phones are allowed to attempt to connect for longer periods, the SYNs will be spaced out with long delays due to the random backoff scheme that TCP employs.

The trend in the telecommunications industry is to provide client/server networks that are able to support more and more phones per PBX. As such, the total time required to connect all of the IP phones continues to grow. It is desirable to minimize the amount of time required for each IP phone to establish a connection with the PBX and therefore minimize the total connection time.

SUMMARY OF THE INVENTION

In one aspect of the present invention there is provided a client/server network including a plurality of IP devices in communication with a central server. The plurality of IP devices are in communication with one another to queue themselves into a linked list for connecting to the central server. Each of the plurality of IP devices includes verification means to verify that a number of IP devices attempting to connect to the central server does not exceed a maximum number prior to attempting connection to the central server.

BRIEF DESCRIPTION OF THE DRAWINGS

The invention will be better understood with reference to the following Figures in which like numerals denote like parts and in which.

DETAILED DESCRIPTION OF THE PREFERRED EMBODIMENTS

Figure 1:
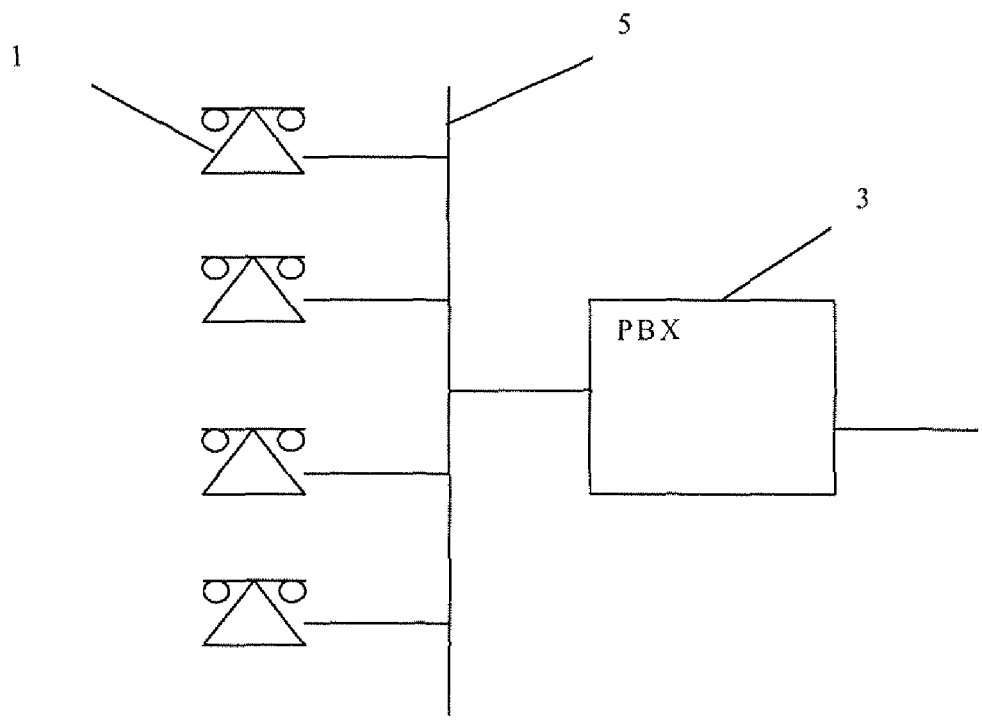
FIG. 1 is a schematic view of a prior art IP phone subnet.

In an embodiment of the present invention, a subnet 5 of stimulus IP phones 1 communicate with a central server 3, or PBX, to provide a client/server network, as shown in FIG. 1. The IP phones further communicate with one another in order to control the number of IP phones 1 attempting to connect to the PBX 3 at one time. Four IP phones 1 are shown in FIG. 1, however, the subnet 5 may include any number of IP phones 1.

Figure 2:
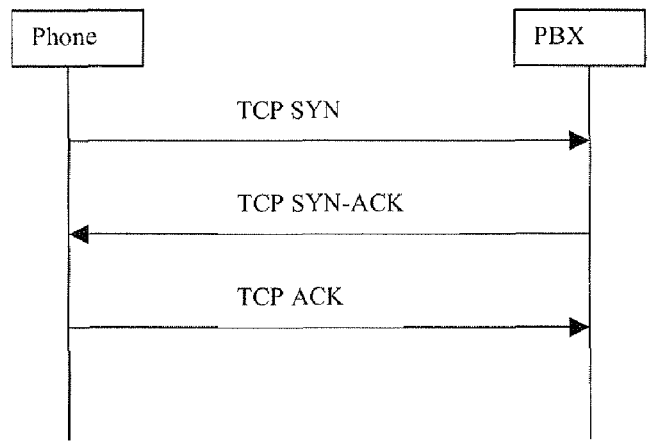
FIG. 2 is a message flow diagram showing an IP phone acquiring a TCP link to a PBX.
Figure 3:
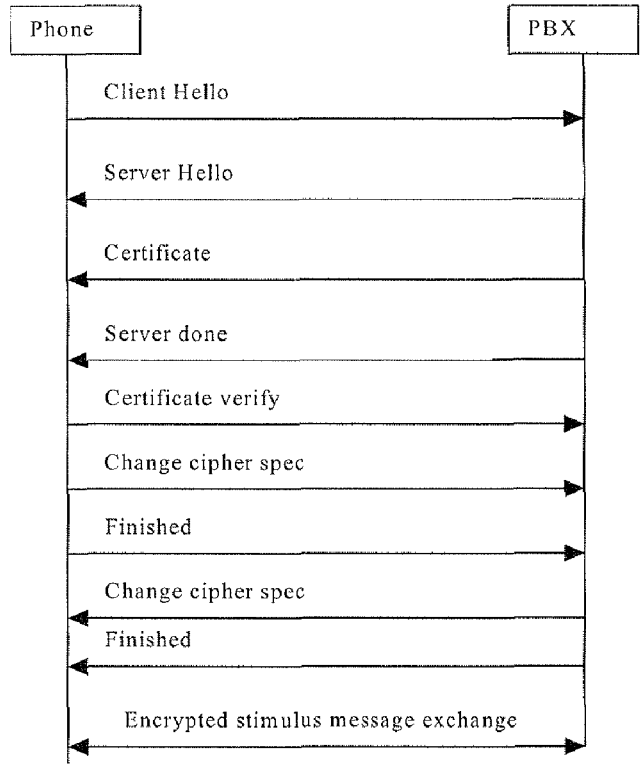
FIG. 3 is a message flow diagram showing an IP phone making a secure connection with a PBX.
Figure 4:
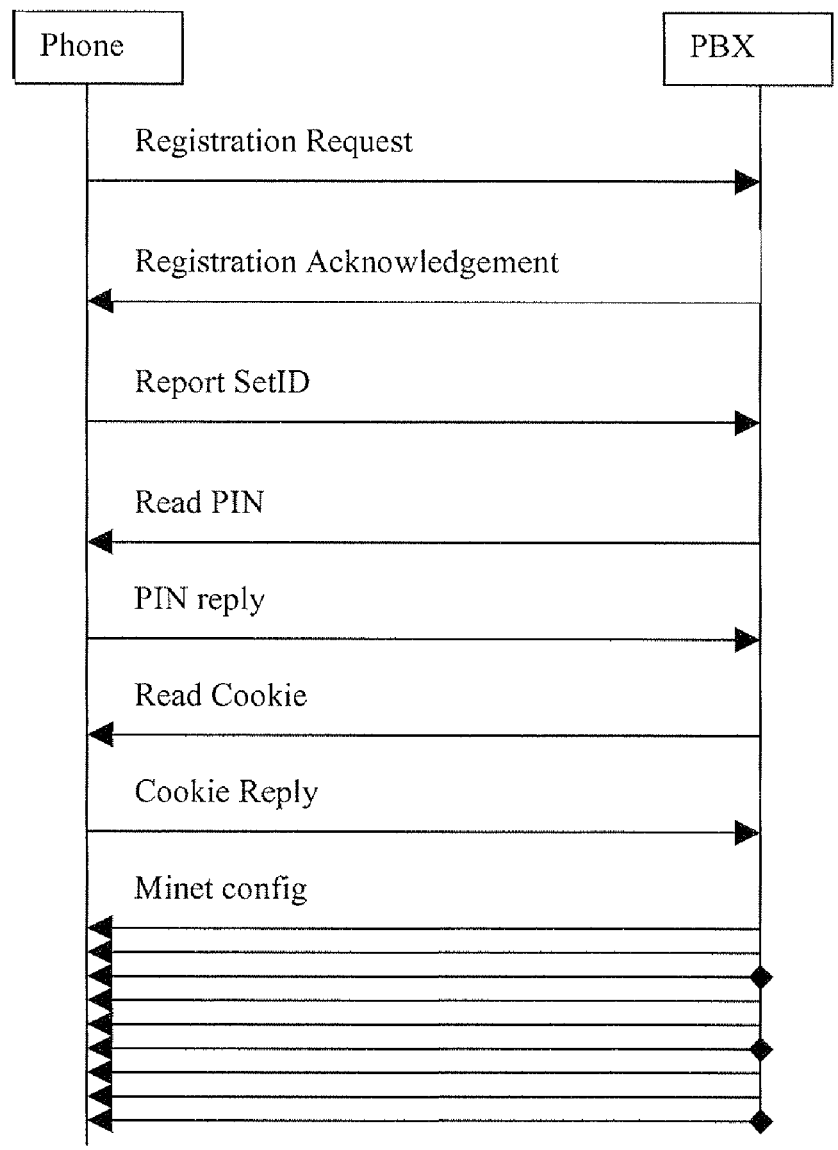
FIG. 4 is a message flow diagram showing an IP phone creating a control link with a PBX.

In order to establish a control link to the PBX 3, IP phones 1 perform a connection process, which generally includes: an initialization delay, advertisement of the IP phone's presence on the subnet 5, joining or creating a doubly linked list and, finally, connecting to the PBX 3. The last step, connection to the PBX 3, includes a TCP connection stage, a Secure Sockets Layer (SSL) stage and a registration stage, as set forth in FIGS. 2, 3 and 4, respectively.

Figure 5:
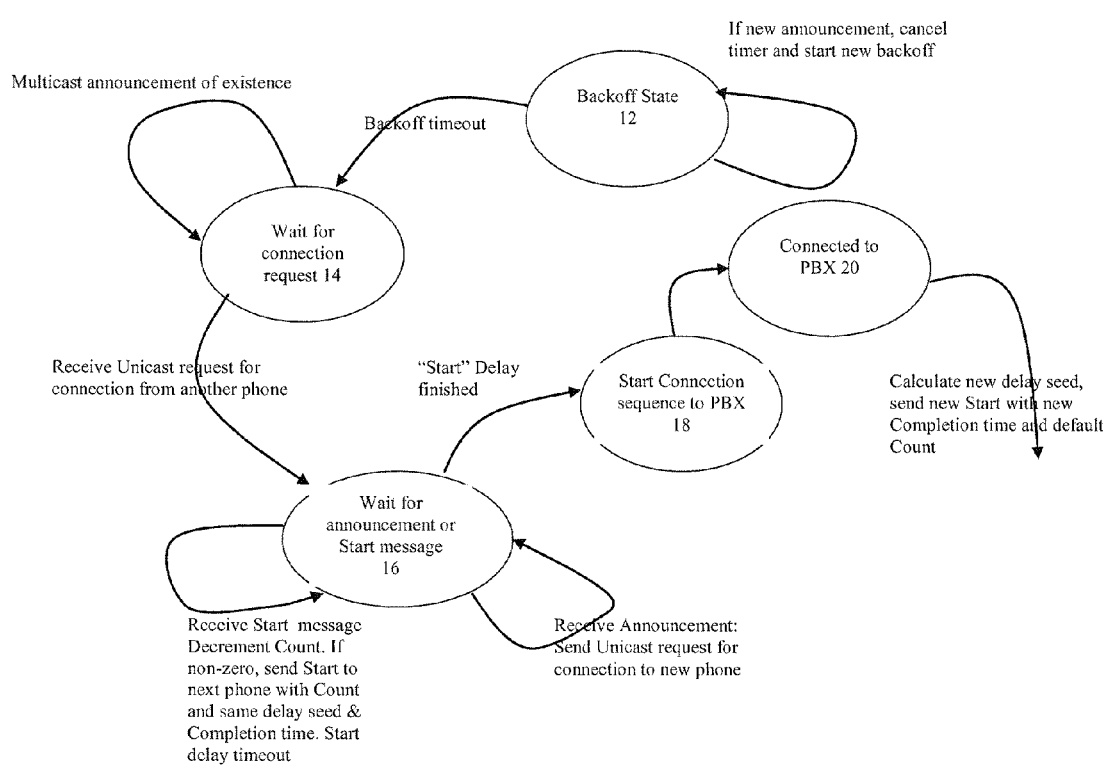
FIG. 5 is a state diagram showing operation of an IP phone according to an embodiment of the present invention.

Referring to FIG. 5, when IP phone1 initializes or for any other reason does not have a connection to the PBX, it enters a backoff state 12 for a random amount of time before sending a multicast "Require Connection" announcement over the subnet 5. The random amount of time is preferably determined in 10 ms granularity using a suitable technique, such as a Media Access Control (MAC) seeded pseudo-random backoff, for example. The maximum amount of time for all IP phones 1 in the subnet 5 to connect with the PBX 3 is related to the maximum number of phones in the subnet 5 multiplied by 10 ms. For example, a subnet having 256 phones would have a maximum backoff spread of 2.56 seconds with 10 ms granularity, and a subnet of 2048 phones would have a maximum backoff spread of 20.48 seconds with 10 ms granularity.

The purpose of the random backoff is to spread out the multicast "Require Connection" announcements of the IP phones 1 in the subnet 5 in order to reduce collisions. Collisions occur when, for example, a number of IP phones 1 are simultaneously initialized or have lost their connection to the PBX and then simultaneously transmit multicast "Require Connection" announcements.

If the IP phones 1 receive a multicast "Require Connection" announcement from another IP phone while they are in the backoff state 12, they reset their backoff timers and remain in the backoff state 12 for a longer period of time. When an IP phone 1 emerges from the backoff state 12 and has not received a multicast "Require Connection" announcement from another phone, the IP phone enters the Wait for Connection Request State 14 and sends its own multicast "Require Connection" announcement in order to advertise its presence on the subnet 1. This advertisement informs an existing doubly linked list of IP phones that the IP phone is seeking a linked list.

Figure 6:
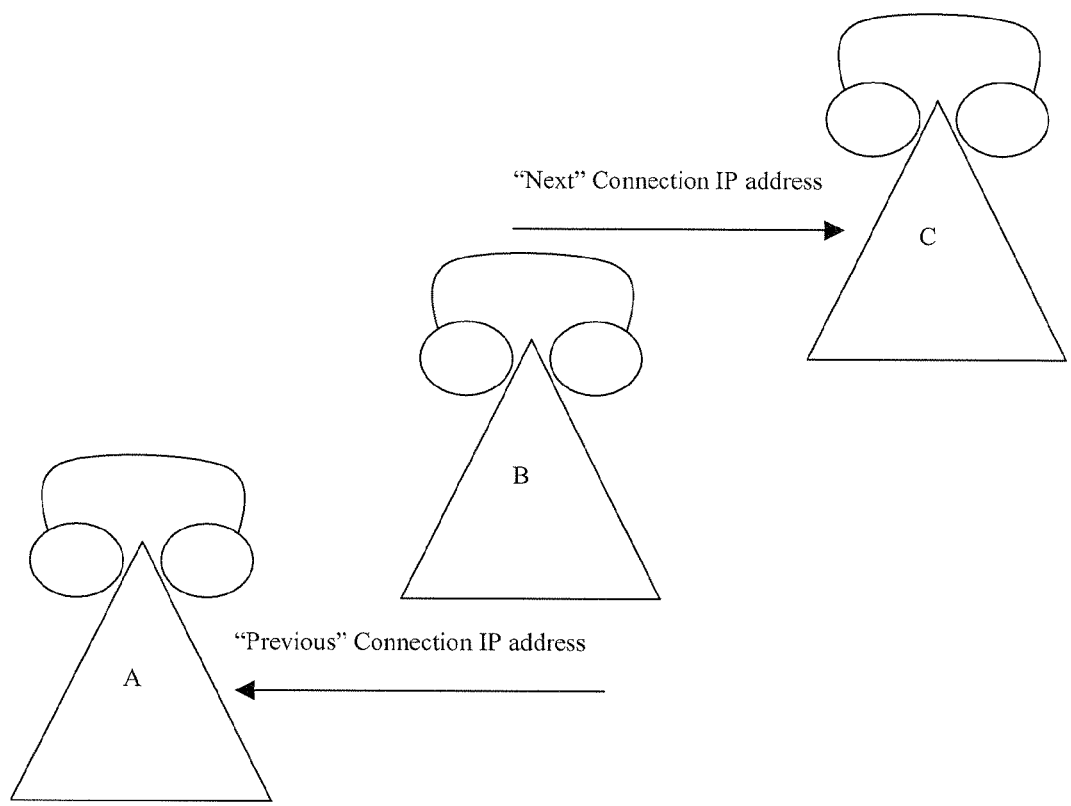
FIG. 6 is a schematic diagram of three IP phones belonging to a doubly linked list.

IP phones 1 that are members of a doubly linked list have two connections: a "previous" connection IP address and a "next" connection IP address, as shown in FIG. 6. The first IP phone 1 on the doubly linked list is referred to as the "head" and will have a null "previous" connection. Similarly, the IP phone 1 at the end of the doubly linked list, which is referred to as the "endpoint", will have a null "next" connection. In the example of FIG. 6, phone A is the head and phone C is the endpoint of the doubly linked list.

Figure 7:
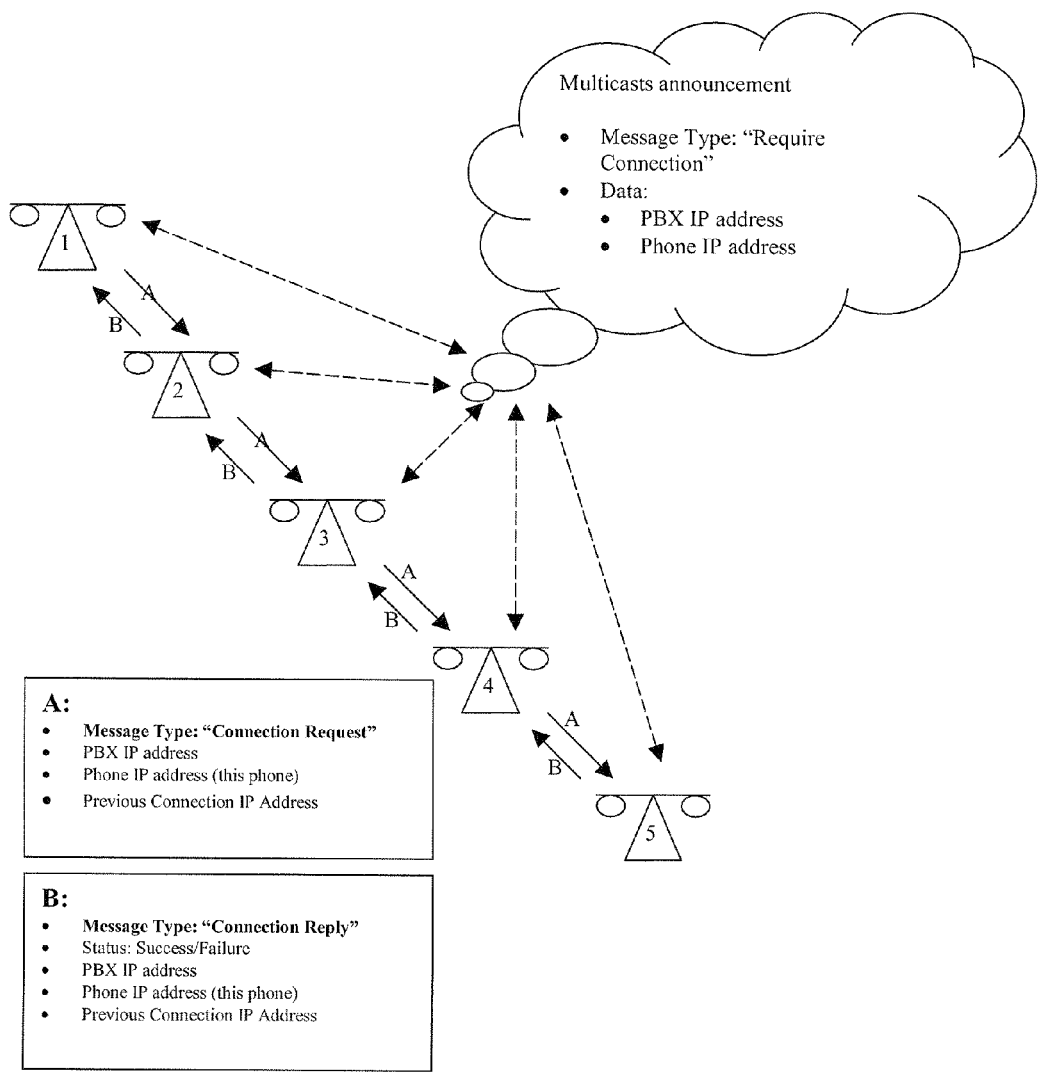
FIG. 7 is a schematic diagram showing the flow of messages between phones to provide a doubly linked list.

An IP phone 1 that has sent a "Require Connection" announcement will either join an existing doubly linked list or create a new doubly linked list, if there is no existing doubly linked list. The portion of the connection process relating to joining a doubly linked list is generally shown in FIG. 7. In response to the new "Require Connection" announcement, an IP phone 1 that is already an endpoint of a doubly linked list, for example, phone 4, will send a unicast "Connection Request" message to the announcing IP phone. The announcing IP phone, which in the example of FIG. 7 is phone 5, will reply with a "Connection Reply" message and will become the new endpoint for the doubly linked list, as shown. If the IP phone 1 has not received a "Connection Request" after a predetermined amount of time following its multicast advertisement, it will create a new doubly linked list with itself as the head.

Once an IP phone 1 is at the head of a new doubly linked list or becomes the endpoint member of an existing doubly linked list, it enters the Wait for Announcement or Start Message State 16, as shown in FIG. 5. In this state, the IP phone 1 may respond to a multicast "Require Connection" announcement from another announcing IP phone with a "Connection Request" message. If the IP phone 1 is an endpoint of an existing list, it waits in State 16 to receive a Start message from its "previous" IP phone prior to initiating a connection attempt to the PBX 3.

If the IP phone 1 is a linked list head, it enters a Start Connection Sequence to PBX State 18 and initiates a connection attempt to the PBX 3 following a backoff period. The backoff period is generally equal to the maximum backoff for the subnet size. Additional IP phones 1 may still be queuing onto the doubly linked list at this time, however, the head of the doubly linked list is free to start connecting to the PBX 3. Once the head has entered the Connected to PBX State 20 and received an appropriate stimulus response, ie. an acknowledgement message, when successfully registered, it informs its "next" connection with a unicast Start message. The "next" connection then becomes the new doubly linked list head.

Figure 8:
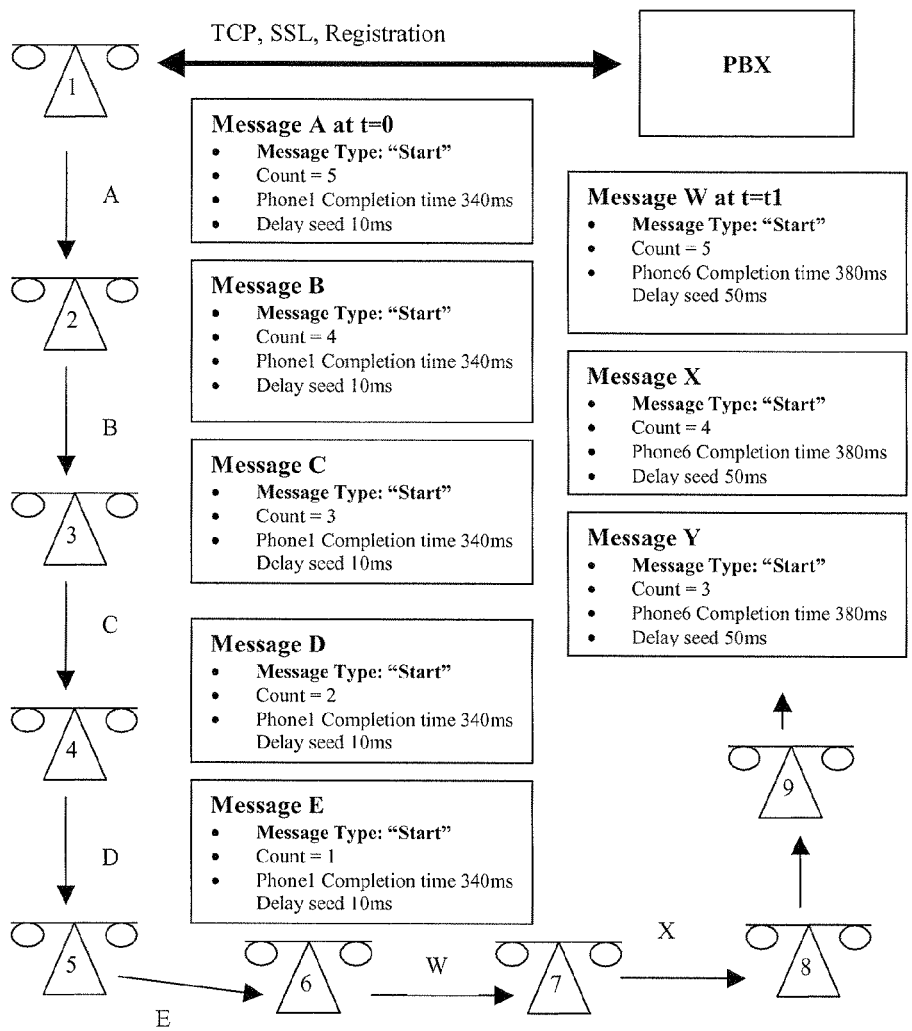
FIG. 8 is a schematic diagram showing the flow of messages between phones in a doubly linked list when attempting to connect to a PBX.

An example of a sequence of start messages being passed through a linked list is generally shown in FIG. 8. The former doubly linked list head, which is phone 1 in FIG. 8, populates the Start message with a count number, a completion time in milliseconds and a delay time in milliseconds. The count number is given a default value of five, which is the number of phones that are allowed to simultaneously attempt a connection with the PBX. The count number is decremented by each phone upon receipt of the Start message and if the count number is greater than zero, the decremented count number is passed to the "next" connection. The completion time is the actual amount of time taken by the former doubly linked list head to complete the IP phone-PBX registration. In the example of FIG. 8, the completion time is 340 ms. Each phone that receives a "Start" message delays a calculated time period prior to entering the start connection Sequence to PBX State 18. The calculated time period is equal to a delay seed, which is preferably given a default time of 10 ms, multiplied by the default count minus the received count. The default count number may alternatively be a number that is greater than or less than five. Similarly, the default time is not limited to 10 ms and, therefore, may be a different value.

The "next" IP phone, which is phone 2 in FIG. 8, receives Start message A and decrements the count number upon receipt of the message. A decremented count number that is greater than zero indicates that the number of phones currently attempting PBX connections is less than the default number and therefore, another IP phone may attempt a PBX connection. In order to allow another IP phone 1 to attempt a PBX connection, phone 2 passes Start message B to phone 3, which is its own "next" connection, and delays for a calculated time period prior to entering the Start Connection Sequence to PBX State 18. The method in which the delay time period is calculated ensures that IP phones that appear further down the doubly linked list delay incrementally more than IP phones that appear earlier in the list. For example, in FIG. 8, phone 2, which receives a start message from phone 1, delays 10 ms*(5−5)=0 ms and phone 3, which receives a start message from phone 2, delays 10 ms*(5−4)=10 ms.

If the recipient of a Start message decrements the count number and it becomes equal to zero, this indicates that the maximum number of IP phones allowed to attempt connection to the PBX at one time has been reached. Therefore, the IP phone waits until it has completely registered with the PBX before sending a Start message including the default count to its "next" connection. In the example of FIG. 8, phone 6 receives a count equal to 1 and therefore waits until it has entered the Connected to PBX State 20 before sending its own Start message W to phone 7. Start message W includes a default count of five, the completion time for phone 6 to connect to the PBX (ie. 380 ms), and a new delay seed. The new delay seed is determined by calculating the difference in the completion times of phone 1 and phone 6 plus the delay seed of the previous batch of phones. In the example of FIG. 8, the new delay seed=(380−340)+10 ms=50 ms. The new completion time and delay seed are passed through the Start messages for the new batch of phones and the count is decremented as has been previously described.

Figure 9:
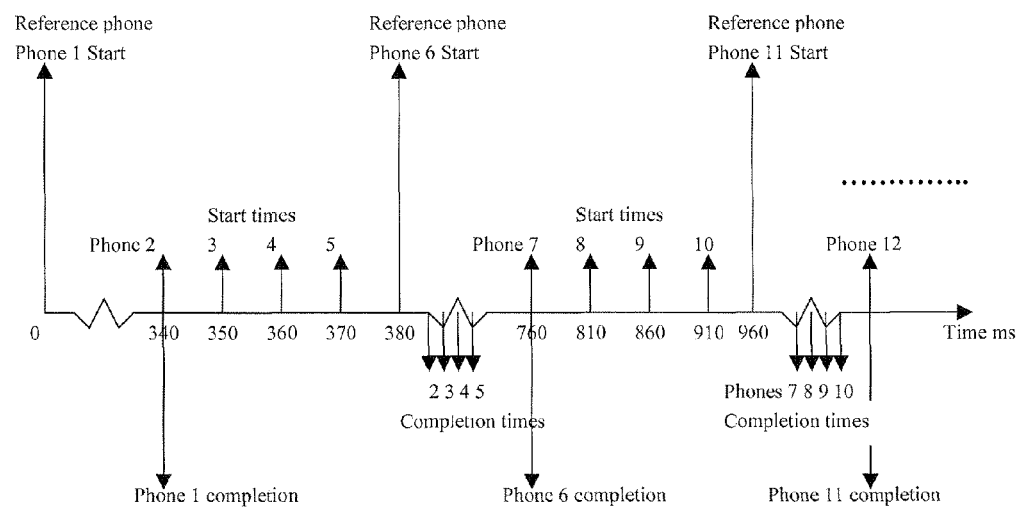
FIG. 9 is a timeline of PBX connection attempts by phones from a doubly linked list.

Referring to FIG. 9, the sequence of IP phones 1 connecting to the PBX 3 is generally shown. By limiting the number of simultaneous connection attempts to a default count number, the PBX 3 is not burdened with a large number of IP phones 1 attempting to connect at the same time.

Figure 10:
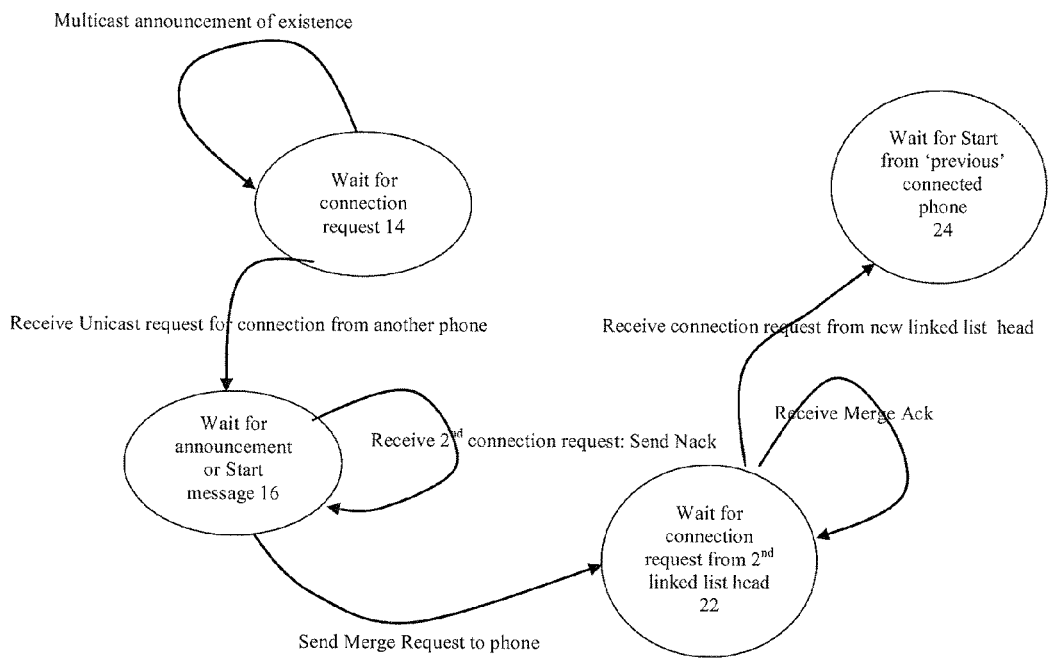
FIG. 10 is a state diagram showing operation of an IP phone receiving more than one connection request.

As previously described, in some cases, multicast "Require Connection" announcement collisions occur. These collisions may result in multiple doubly linked lists of IP phones being created. As such, many IP phones 1 may respond to the announcing IP phone 1 with a "Connection Request" message. Referring to FIG. 10, a state diagram showing operation of an IP phone 1 receiving two connection requests is generally shown. Similar to an IP phone 1 that receives only a single "Connection Request" message, the IP phone 1 exits the backoff state (not shown) and is in a Wait for Connection Request State 14 after sending a multicast "Require Connection" announcement to the other IP phones 1 on the subnet 5. The announcing IP phone 1 receives a unicast "Connection Request" from a first IP phone 1 and enters a Wait for Announcement State 16. While in the Wait for Announcement or Start Message State 16, the announcing IP phone receives a unicast "Connection Request" from a second IP phone.

Figure 11:
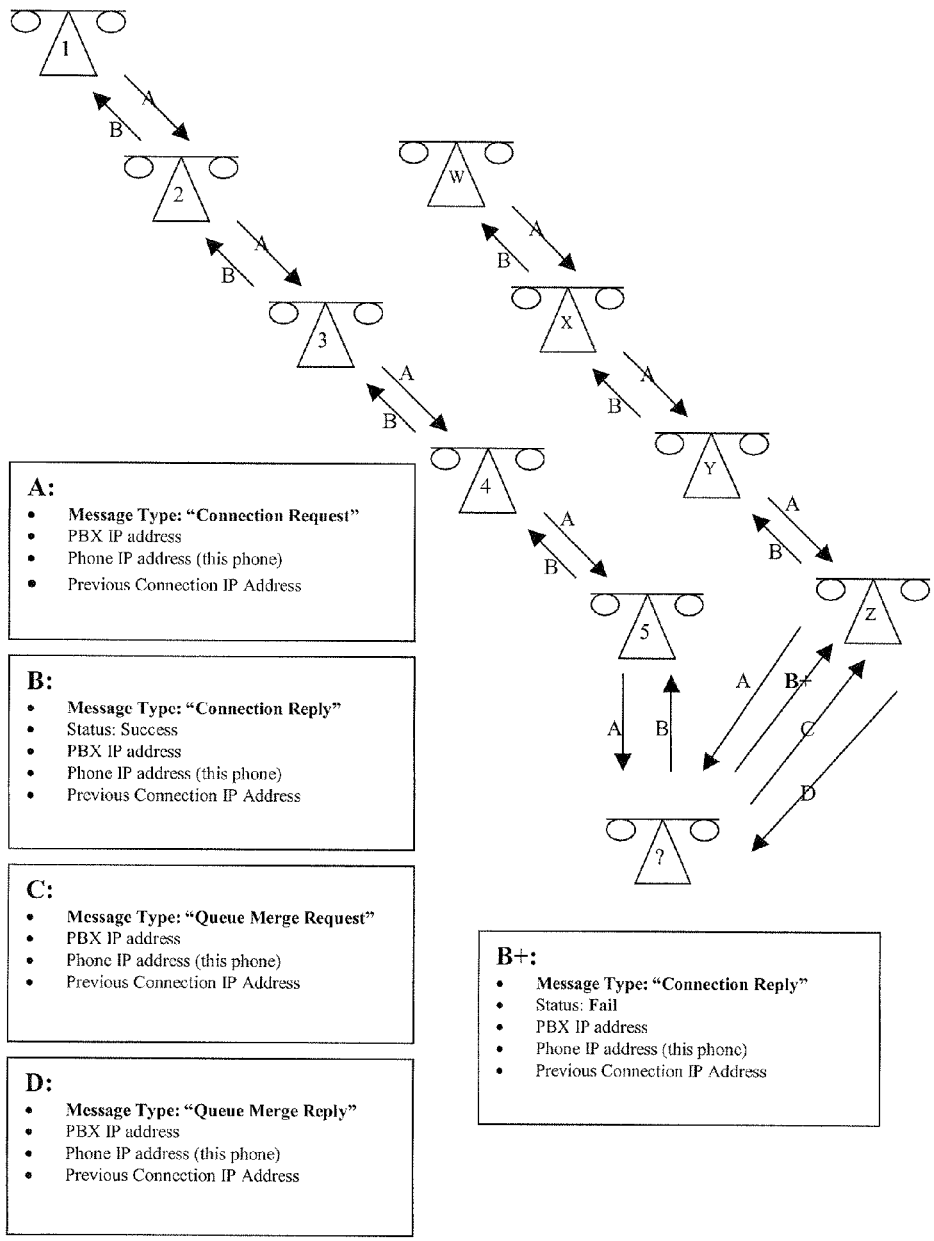
FIGS. 11, 12 and 13 are schematic diagrams depicting a merging operation between two doubly linked lists

As shown in FIG. 11, the announcing IP phone only accepts a single connection request and thus sends a unicast "Connection Reply, Success" message to the first IP phone. The announcing IP phone rejects the connection request from the second IP phone by sending a unicast "Connection Reply, Failure" message to the second IP phone.

Figure 12:
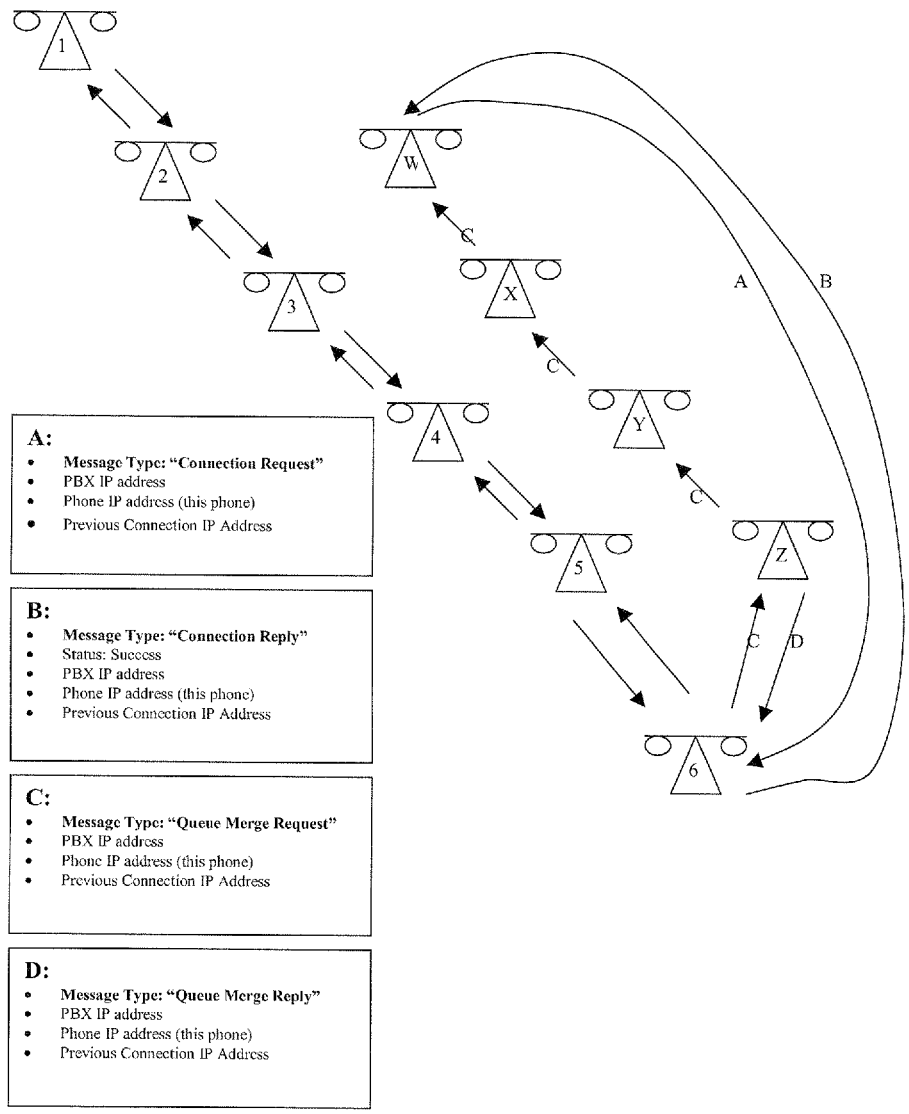
Figure 13:
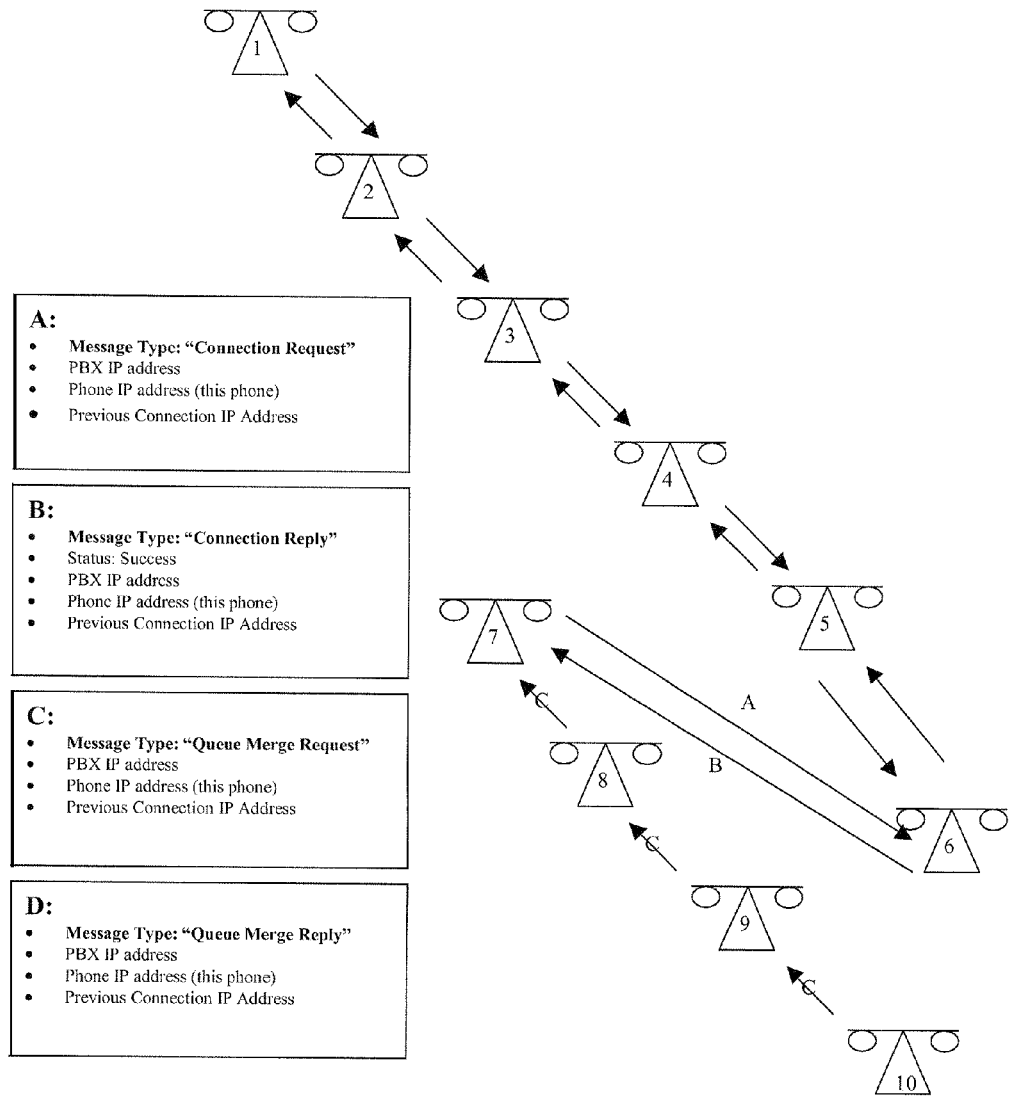

The announcing IP phone then sends a "Queue Merge Request" message to the second IP phone in order to merge the doubly linked list of the second IP phone into its own doubly linked list. Once the "Queue Merge Request" message has been sent to the second IP phone, the announcing IP phone then enters a Wait for Connection Request from the Second Linked List Head State 22 and receives a "Queue Merge Reply" message from the second IP phone. Referring also to FIG. 12, since it is the head, rather than the endpoint, of the second IP phone's linked list that is to be the "next" connection for the announcing phone, the second IP phone percolates the "Queue Merge Request" message through its linked list until the message reaches its head. When the head receives the "Queue Merge Request" message, it sends a "Connection Request" message to the announcing IP phone and receives a "Connection Reply, Success" message therefrom to provide a merged doubly linked list, as shown in FIG. 12. The announcing IP phone then enters a Wait for Start from Previous Connected Phone State 24. State 24 is similar to State 16 of FIG. 4, however, the announcing IP phone is not the endpoint and therefore does not wait for a "Require Connection" announcement.

In order to maintain the integrity of the new doubly linked list, all IP phones will initiate a unicast "Keepalive" message exchange, preferably every five seconds, with their "previous" connection. In the event that the IP phone's "previous" connection does not respond within, preferably one second, the doubly linked list is deemed breached and the IP phone becomes the new head for its doubly linked list.

In another embodiment, the IP phones notify their peers to perform specific actions. For example, the IP phones may have their messaging enhanced to include specific instructions for how many times to attempt a TCP connection to a specific port, or the IP phones may inform their peers to attempt to connect to a specific range of TCP ports. Further, the IP phones may inform one another to attempt to connect to a different PBX if they are unable to connect to a first PBX within a specific amount of time.

It will be appreciated by a person skilled in the art that the present invention is not limited to IP phones. Any IP device connecting to a central server may be used including computers, or other network devices, for example.

A specific embodiment of the present invention has been shown and described herein. However, modifications and variations may occur to those skilled in the art. All such modifications and variations are believed to be within the sphere and scope of the present invention.

What is claimed is:

1. A client/server network comprising: a plurality of IP phones in communication with a central server over a subnet, said plurality of IP phones transmitting unicast messages to one another to queue themselves into a list for connecting to said central server; wherein each of said plurality of IP phones includes verification means to verify that a number of IP phones attempting to connect to said central server does not exceed a maximum number prior to attempting connection to said central server; and wherein said verification means includes means for receiving a unicast message from a previous one of said plurality of IP phones in said list, said unicast message including said maximum number of IP phones attempting to connect to said central server.

2. The client/server network as claimed in claim 1, wherein each of said plurality of IP phones includes a count number, said count number being received from said previous one of said plurality of IP phones in said list and a decremented count number being passed to a next one of said plurality of IP phones in said list.

3. The client/server network as claimed in claim 1, wherein said unicast messages is a start message, said start message for prompting each of said plurality of IP phones to attempt to connect to said central server, server connection attempts occurring in an order determined by said list.

4. A method for a plurality of IP phones to connect to a central server, said method comprising: queuing said plurality of IP phones into a list; attempting connection of respective ones of said plurality of IP phones to said central server in an order determined by said list; wherein each of said plurality of IP phones verifies that a number of IP phones attempting connection to said central server is less than a maximum number prior to attempting connection to said central server;
  wherein each of said plurality of IP phones in said list maintains an IP address of a previous one of said plurality of IP phones in said list and a next one of said plurality of IP phones in said list; and
  wherein each of said plurality of IP phones learns said number of IP phones attempting to connect to said central server from said previous one of said plurality of IP phones in said list.

5. The method as claimed in claim 4, wherein each of said plurality of IP phones increments said number of IP phones attempting to connect to said central server and passes a new number to said next one of said plurality of IP phones in said list.

6. The method network as claimed in claim 4, wherein said plurality of IP phones attempt to connect to said central server in an order determined by said list.

* * * * *